Oct. 27, 1936.　　　C. K. BRANDSTROM　　　2,058,560
POTATO STARCH EXTRACTING MACHINE
Filed July 10, 1935　　　2 Sheets-Sheet 1
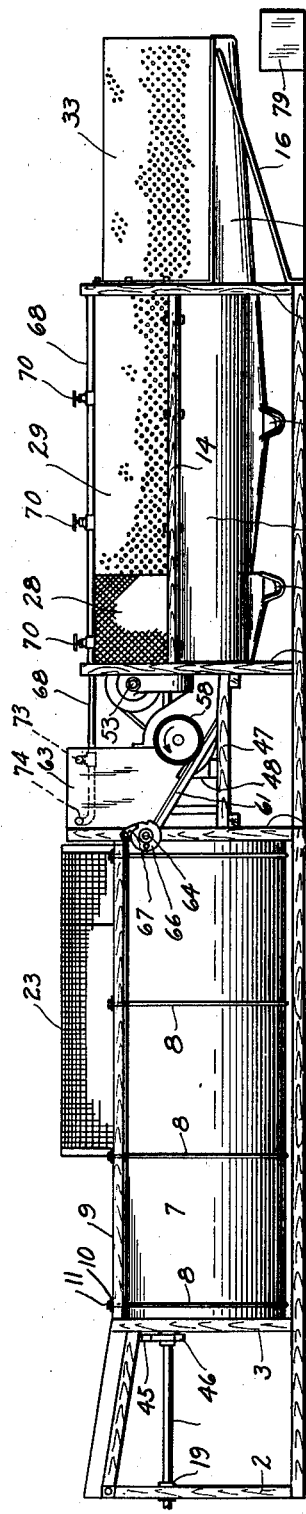
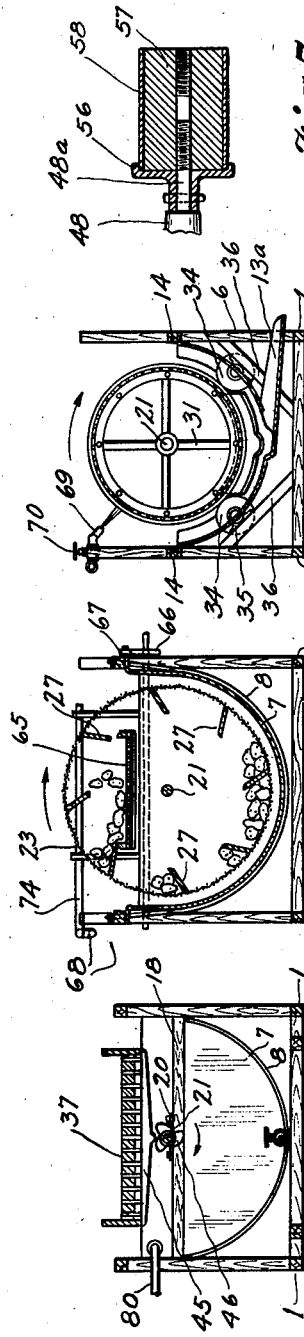
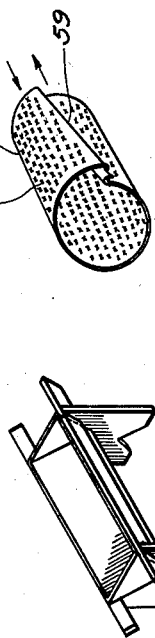
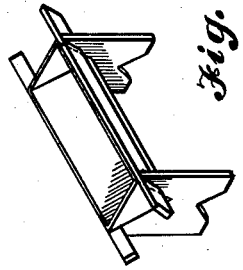
INVENTOR.
Charles K. Brandstrom,
BY
ATTORNEYS.

Oct. 27, 1936.  C. K. BRANDSTROM  2,058,560
POTATO STARCH EXTRACTING MACHINE
Filed July 10, 1935   2 Sheets-Sheet 2
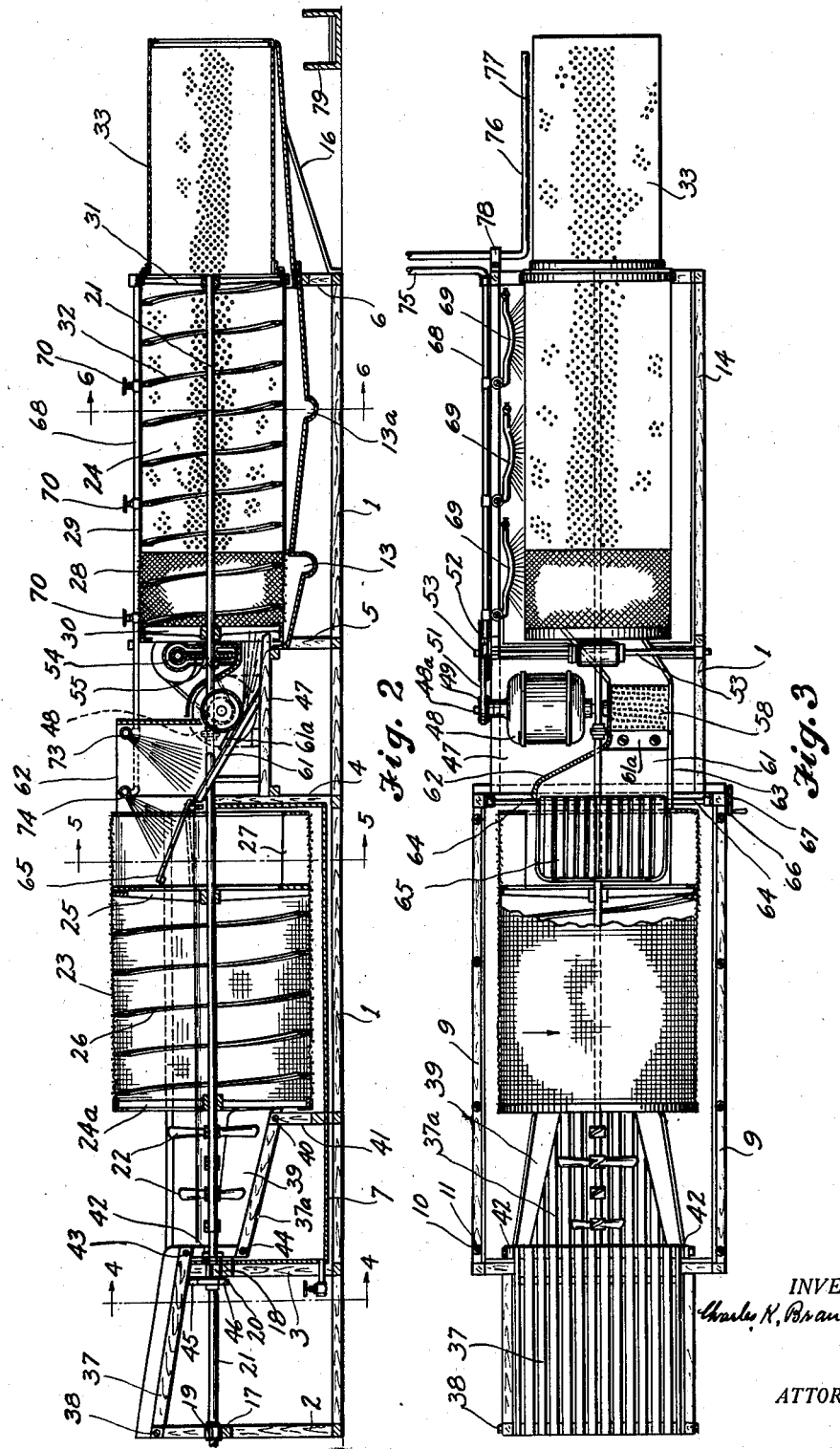
INVENTOR.
Charles K. Brandstrom,
ATTORNEYS.

Patented Oct. 27, 1936

2,058,560

UNITED STATES PATENT OFFICE 2,058,560

POTATO STARCH EXTRACTING MACHINE

Charles K. Brandstrom, Seattle, Wash.

Application July 10, 1935, Serial No. 30,702

3 Claims. (Cl. 127—23)

This invention relates to machines or apparatus, and to methods, for extracting starch from potatoes.

The effectiveness of starch extraction, depends primarily upon the extent to which the walls of the cells that contain starch granules are cut or ruptured, and to the rapidity with which the starch is thereafter separated from the particles of ruptured cell walls, skins of the potatoes and other matter therewith.

Machines and processes have been heretofore used for extracting starch from potatoes, but they have failed to meet the requirements of the art, and in particular they have failed to properly and completely rupture or open all of the starch holding cells, and have failed to separate the starch from the pulp afterward in such brief periods of time as is necessary to prevent discoloration and loss in strength of the starch. Chemicals have been used to attempt to whiten the starch and remove such discolorations but such practice has been objectionable to the trade, and in use, for many reasons.

Usually the potatoes have been ground and re-ground or reduced to pulp, by some form of mechanism, and such pulp then later removed to another separate machine for starch separation. The starch and matter therewith then frequently have been deposited in large vats, whereon the starch became discolored during the delay required in separating such starch from such large masses of residue.

Again the ordinary apparatus formerly made has been too cumbersome and expensive to permit its general use, particularly by individual farmers.

It is therefore an object of this invention to provide a unified compact apparatus whereby pure white starch may be extracted from potatoes, without unnecessary delay, and without the use of chemicals.

It is another object, to provide such an apparatus with three cylinders mounted tandem on one shaft and revolvable therewith, also a grinder or attrition means mounted between the first two cylinders and all simultaneously driven by one motor. The front or washing cylinder adapted for cleaning the potatoes, the grinder adapted for pulping the same, the second or separating cylinder adapted for straining most of the starch from the pulp; and the third or drying cylinder adapted for draining any remainder of starch from the pulp and for discharging the cellulose and residue matter.

It is a further object to provide in said first two cylinders and in fixed relation therewith, helical or screw positioned ribs, with spiral passageways between the ribs for the passage of potatoes through said first cylinder, and pulp through said middle cylinder, when said shaft and cylinders are revolved. Said middle cylinders provided with perforations and also means for projecting sprays of water against the upper portion of the upturning side thereof, to prevent said perforations being clogged with pulp and to keep the latter within such cylinder, and to provide a proper supply of water in the upraised pulp adjacent said side for separating the starch from the said pulp. Said drying cylinder provided with means for forcing air blasts against its exterior to prevent perforations in the same from becoming clogged, and for drying the cellulose and residue.

A still further object is to provide a grinder between the first and second cylinders, formed with a core for adjustable attachment upon power shaft, with an adjustable roughened or toothed attrition sleeve thereon, for grinding the potatoes into pulp and for rupturing all of the starch cells to release all of the starch therefrom. Said sleeve also adapted for driving such pulp into said second cylinder for screening the starch from such pulp.

It is another object to provide portable rinsing and settling troughs for receiving the liquefied starch and water from said second and third cylinders, said troughs in V shape, so that any possible dirt will settle in the narrow bottom and from which any escaped pulp and water may be poured off from the starch as soon as it has solidified.

With these and other objects that will hereinafter appear, I have illustratively exemplified my invention by the accompanying drawings of which—

Fig. 1 is a side elevation of my machine.

Fig. 2 is a vertical section through the axis of the machine.

Fig. 3 is a plan view of the machine.

Fig. 4 is a section upon the line 4—4 of Fig. 2.

Fig. 5 is a section upon the line 5—5 of Fig. 2.

Fig. 6 is a section upon the line 6—6 of Fig. 2.

Fig. 7 is a cross section of the attrition head.

Fig. 8 is a perspective of the attrition sleeve showing the locking means.

Fig. 9 is a perspective of the sprayer head.

Fig. 10 is a perspective of the settling and rinsing troughs.

Referring more particularly to the drawings: Reference numeral 1 represents the base plates or stringers of the machine upon which are mounted the cross frames 2, 3, 4, 5, and 6.

Between frames 3 and 4 is suspended a semicircular water trough or tank 7, held in place by U bolts or straps 8, the upper ends of which pass through members 9 secured between the frames 3 and 4 and provided with washers 10 and nuts 11. Between frames 5 and 6 is suspended another trough 12, provided with spouts 13 and 13a. This trough is held in place by bolts or screws to members 14 supported between cross frames 5 and 6 (Figs. 1 and 6). 15 is another trough, the inner end of which rests in the outer end of trough 12 and the outer end supported by braces 16 (Figs. 1 and 2).

To cross members 17 and 18 of side frames 2 and 3 respectively are secured bearings 19 and 20, which support the main shaft 21 of the machine, upon which are secured propellers 22, and two cylinders, each represented in their entirety by reference numerals 23 and 24.

The cylinder 23 is composed of cylindrical screen mounted on end frames 24a and 25, which are keyed or clamped on shaft 21. The portion of the cylinder between its frames 24a and 25 is provided with a helical rib or screw 26, and the portion of the cylinder to the right of frame 25 is provided with lifters 27 (Figs. 2 and 5). The outer portion of drum 24 is provided with a cylindrical screen 28, of a very fine mesh and a cylindrical shell 29, provided with fine perforations. This cylinder is supported by end frames 30 and 31, keyed or clamped to the shaft 21. Running the entire length of the inner surface of the cylinder is a helical rib or screw 32. Securely bolted to the right hand end of cylinder 24 is another cylinder 33, composed of a perforated shell. The outer end of cylinder 24 is supported upon rollers 34, supported by bearing 35, secured to diagonal braces 36 in frame 6 (Fig. 6).

Suspended between the uprights comprising cross frames 2 and 3 is a shaking grill 37, the upper or left hand end of which is pivoted upon the cross shaft 38 supported at the upper end of uprights comprising frame 2. Submerged in the tank 7 is another shaking grill 37a with side boards 39. The lower end of grill 37a is pivoted at 40 to a frame 41 located in the tank. The upper end of the grill 37a connects with the lower grill 37 by means of connecting links 42 and pivot pins 43 and 44 (Fig. 2). Near the lower end of grill 37 and adjacent to cross frame 2 is a cross member 45, which rests upon a cam 46, keyed to the shaft 21 (Figs. 1, 2, and 4) and is designed in such a manner that upon rotation it will lift the lower end of grill 37 and consequently upper end of grill 37a and let them drop suddenly.

Between cross frames 4 and 5 is supported a platform 47 upon which rests a motor 48. To the outer end of the shaft 48a of the motor 48 is a grooved pulley 49, which by means of a belt 51 drives the pulley 52 keyed upon shaft 53, near the center of which is keyed a worm 54, meshing with the worm gear 55, keyed to the main shaft 21. To the inner end of motor shaft 48a is screwed an attrition head composed of the head block 56 keyed to the motor shaft 48a, a core 57 screwed to the shaft 48a, and sleeve 58, which is shown more in detail in Fig. 8. The attrition sleeve 58 is cylindrical in form and is provided with a diagonal locking seam 59 so that when the two sides of the seam are slid, as indicated by the arrows, the diameter of the cylinder will be lessened consequently, locking it on the core 57. The core 57 is threaded in such a manner that it will tend to screw itself more securely in place upon the rotation of the motor. Core 57 is threaded at both ends so that it may be reversed upon the shaft 48a in case the attrition sleeve is worn dull due to rotation in one direction. The attrition sleeve 58 is provided with sharp projections 60 which may be similar to those of ordinary household graters.

61 is a chute provided with sides 62 and 63 as shown in Figs. 1, 2, and 3. This chute immediately in front of the attrition head is provided with a replaceable hard rubber block 61a. Near the upper end of chute 61, supported on the uprights of cross frame 4 is rotatably mounted a shaft 64 to center position of which is rigidly secured the tilting grill 65. To the outer end of shaft 64 is secured a ratchet wheel 66, which engages with a pawl 67. By turning the ratchet wheel 66 and setting the pawl 67, the tilting grill 65 may be set at different angles (Figs. 1, 2, 3, and 5).

Supported to frame of the machine is a water pipe 68 to which are connected sprayer heads 69, shown more in detail in Fig. 9. These sprayer heads may be turned off or on independently by means of valves 70. The sprinkler heads are bent as shown in Figs. 3 and 9 and provided with a narrow slit 71, which will cause a fanlike spray when the water is turned on. The outer end is provided with a petcock 72 for draining or cleaning. Near the left hand end of pipe 68 are branch pipes 73 and 74 perforated or slit so as to sprinkle on chute 61 and tilting grill 65 respectively, as shown in Fig. 2. The right hand end of pipe 68 is connected to the main water supply line 75. 76 is an air pipe, slit as shown at 77, and secured to the frame of the machine at 78.

The location of the sprayer heads 69, with slit openings 71 is important both in form and location, for discharging a flat or fan shaped spray on the outside of the upturning portion or shoulder of the cylinder opposite. As the cylinder revolves the supply of pulp therein is moved upward slightly therewith so that there is little of the pulp along the center line of the bottom of cylinder, and skins and waste fibre matter tend to clog the screen and ride up inside the same. The sprays of water along the shoulders on the upturning side, force all such skins and waste matter back into the cylinder, and keep the screen clear, and also the water therefrom runs down into the cylinder and washes back the pulp and aids in washing out the milky starch therefrom, and draining through the open meshes of the turning screen. Attempts have been made to provide water to revolving starch cylinders by dripping upon the top centers thereof, and also to provide interior jets of water; but these are useless as the dripping water has no force for clearing the screen and the water falls behind the mass of pulp inside the cylinder, and so does not liquefy the same or assist in washing the starch therefrom. Interior jets of water have been provided for clearing the screen, but these merely force a portion of the skins and waste matter out into the settling troughs with the starch, and so discolor and injure the product.

The method of operation is as follows:

The motor is set into operation which in turn, through belt 51, pulley 52, shaft 53, worm 54, worm gear 55, turns the shaft 21 with the paddles 22, cylinders 23, 24, and 33, in the direction indicated by the arrows. The attrition head is turned at motor speed in the direction indicated. The potatoes are dropped on the shaking grill 37, which receives its shaking motion through cam 46. On this grill most of the loose dirt is shaken off. As shaking continues they finally work their way down, falling off the lower end onto the shaking grill 37a, which is submerged in tank 7. Here the potatoes are agitated and tumbled around by means of propeller blades 22. The tank 7 receives its water from sprayer pipe 74. A constant water level is maintained by means of overflow pipe 80, Fig. 4. As the potatoes are finally shaken and worked off this grill, due to action of propellers, they enter into the rotating cylinder 23 in which the potatoes are gradually worked towards the right into the right hand end of the cylinder. Here the potatoes are carried up by the lifters 27 and dropped onto the tilting grill 65 where the final spray washing of the potatoes are performed. The potatoes slide off of this grill on to the chute 61 where they are given the correct mixture with water before coming in contact with the attrition sleeve 58, where they are very finely ground and thrown into the revolving cylinder 24. The very finest ground potatoes, with the water mixture which is in the form of this milk containing starch and known as milk of starch passes through the very fine screen 28 and out through the spout 13 (Figs. 1 and 2), into a settling trough as shown in Fig. 10. The rest—ground potatoes—with its water or milk of starch passes through the perforated shell 29 into spout 13a into another settling trough of type shown in Fig. 10.

The water sprayed into the cylinder 24 by the sprayer heads performs a double duty. First, it cleanses the perforations of the cylinder from fiber and bran, and after the water enters into the cylinder, it mixes with the pulp and extracts the starch. The fiber and pulp, or the part which is not passed through the screen, is finally passed into cylinder 33 where any remaining liquid or milk of starch is carried off into the trough 15 and finally into spout 13a. The final fiber and pulp is carried through the cylinder where it passes into the basin or conveyor 79. The perforations in the cylinder 33 are kept open by a blast of air from pipe 76.

This apparatus may be built either in large proportions for factory use, or may be completed in a size small enough to be placed on a vehicle and moved into a field, where the potatoes grew, and there be operated, so that only the starch need be moved away. The pulp if not desired for stock feed may be left on the ground, for fertilizer. The separation and precipitation of the starch is facilitated by the use of cold water below 50 degrees Fahrenheit, or by use of ice in the water supply in warm weather.

Sweet potatoes are treated with practically the same results as from the white potatoes, but the screening openings should be of a finer mesh for the sweet variety.

By the use of my apparatus I have obtained pure white starch, without the addition of any chemicals, and have so utilized cull potatoes and others affected by dry rot and blight. I have also saved the starch from frozen potatoes, when pulped immediately after thawing.

While I have shown a preferred, particular form of embodiment of my invention, I am aware that many minor changes will readily suggest themselves to those skilled in the art without departing from the spirit and scope of my invention, and appended claims. I, therefore, desire to avoid being limited to the particular form of embodiment which I have hereinabove shown and described and referred to in appended claims. Having described my invention which I claim as new and unique, I desire to protect it by Letters Patent of the United States of America, as follows.

I am aware that prior to my invention, starch has been and is being extracted from starch-yielding tubers and potatoes. I, therefore, do not claim that art broadly, but—

I claim:

1. A unified apparatus for separating starch from potatoes, comprising, means for cleaning potatoes including vibratory grills and agitators and a rotary washing cylinder mounted in a tank, and means for supplying wash water thereto, means for moving the potatoes through the cylinder and means for lifting the potatoes to the top of a feed chute, a grinder comprising a rotary core and an adjustable attrition sleeve thereon for pulping the potatoes and for rupturing the starch cells, said feed chute adapted to feed said potatoes to said grinder, a separating cylinder adjacent said grinder adapted to receive said pulp directly therefrom, said separating cylinder covered with a screen of varying sized mesh for straining the starch from the pulp, a helical rib affixed around the interior of said separating cylinder for conveying said pulp through the same and for pressing the starch from the pulp outward through the screen, means for projecting sprays of water against the exterior side of said last described cylinder for cleaning the same for supplying water to the pulp to facilitate the release of the starch therefrom, a fixed trough with discharge chutes beneath said separating cylinder for collecting and discharging the starch and fluid matter therefrom, with means for simultaneously revolving the said cylinders and grinder, each of said cylinders and grinder coaxially mounted and all of said moving parts operated by one shaft.

2. An apparatus for separating starch from potatoes, comprising a screen covered washing cylinder rotatably mounted in a water tank for cleaning potatoes, a screen covered separating cylinder rotatably mounted over a starch collecting trough and grinding means for pulping the potatoes rotatably mounted between said cylinders, a chute for conveying the potatoes from the washing cylinder to the grinding means, said separating cylinder being placed and adapted to receive said pulp directly from said grinding means, pipes for projecting sprays of water against the exterior and upturning side of the separating cylinder for cleaning the same and for liquefying the pulp therein, with means for conveying said potatoes and pulp through said cylinders respectively, and connected means for simultaneously rotating said grinding means rapidly, and for rotating said separating cylinder, slowly to separate the starch from said pulp said cylinders and grinder coaxially mounted and all of said moving parts driven by the same shaft.

3. An apparatus for separating starch from potatoes, comprising in combination, means for washing potatoes, means for feeding the same to a grinder, a grinder for reducing said potatoes into pulp, a cylinder covered with a screen, and adapted to receive said pulp at its inner end from said grinder, and means for conveying said pulp along the inside of said screened cylinder, and means for spraying water into said pulp to facilitate the separation of most of the starch through said screen, together with a drying cylinder adjacent to the outer end of said screened cylinder, and adapted to receive pulp therefrom, said drying cylinder covered with a perforated shell, for the escape of any starch remaining in said pulp, and means for projecting blasts of air against the outside of said shell for maintaining said perforations open, and for drying the separated pulp while passing through said last cylinder, said cylinders and said grinder and rotational parts, unified, and simultaneously driven by one connection power shaft.

CHARLES K. BRANDSTROM.